May 23, 1961          C. F. MASON          2,985,828
PULSE WIDTH EVALUATING SYSTEM
Filed Aug. 19, 1959                     4 Sheets-Sheet 1

*INVENTOR.*
CHARLES F. MASON
BY *Gust & Irish*

ATTORNEYS

May 23, 1961

C. F. MASON 2,985,828

PULSE WIDTH EVALUATING SYSTEM

Filed Aug. 19, 1959

INVENTOR.
CHARLES F. MASON

BY *Gust & Irish*

ATTORNEYS

May 23, 1961 C. F. MASON 2,985,828
PULSE WIDTH EVALUATING SYSTEM
Filed Aug. 19, 1959 4 Sheets-Sheet 4

FIG. 4

INVENTOR.
CHARLES F. MASON
BY Gust & Irish
ATTORNEYS

United States Patent Office 2,985,828
Patented May 23, 1961

2,985,828

PULSE WIDTH EVALUATING SYSTEM

Charles F. Mason, Fort Wayne, Ind., assignor to International Telephone and Telegraph Corporation Filed Aug. 19, 1959, Ser. No. 834,733

11 Claims. (Cl. 324—68)

This invention relates generally to electrical testing apparatus, and more particularly to a system for evaluating the width of an electrical pulse to determine whether it is within predetermined tolerance limits.

It is often desirable in the testing of electronic apparatus to determine whether the width of a given pulse is within desired limits. In the past, such measurements have customarily been made by physically measuring the width of the pulse as displayed on an oscilloscope. However, in the case of the testing of complex electronic apparatus, prior conventional methods for measuring pulse width are too time consuming, and it is therefore desirable to provide a system for automatically evaluating a given pulse and determining whether its width is within a predetermined tolerance, and it is further desirable that such a system provide a "Go" or "No-Go" output, i.e., one signal if the pulse evaluated is within tolerance limits and another signal if the pulse is outside of the tolerance limits. It is further desirable that the tolerance limits be easily changed, and that the system lend itself to automatic programming so that pulses of different widths, such as those provided by a programmed pulse width modulator, can speedily be evaluated. It is additionally desirable that such a system be highly accurate, and employ static components.

It is therefore a general object of my invention to provide an improved pulse width evaluating system.

A specific object of my invention is to provide an automatic pulse width evaluating system incorporating the desirable features enumerated above.

My invention, in its broader aspects, provides a pulse width evaluating system having an input circuit for receiving the input pulse to be evaluated and including means for differentiating at least the trailing edge of the input pulse. Gating means are provided coupled to the input circuit, the gating means being normally closed and having means for opening the same, thereby to pass the differentiated trailing edge responsive to a gating signal. Timing means is provided, which, in the preferred embodiment of my invention, is a binary-type pulse counting chain having means for initiating a timing period coincident with the leading edge of the input pulse. The timing means has means providing a signal of predetermined duration after a predetermined time delay following initiation of the timing period. Means are provided coupling the timing means to the gating means for providing the gating signal thereto responsive to the timing signal so that the differentiated trailing edge of the input pulse is passed by the gating means only when it occurs during the gating signal. Memory means, which in the preferred embodiment is a bistable multivibrator, is coupled to the gating means to provide a first level output signal when no signal has been passed by the gating means, and a second level output signal responsive to passage of the differentiated trailing edge of the input pulse by the gating means, thereby providing an indication of whether the width of the input pulse is within the tolerance established by the predetermined time delay and the duration of the gating signal.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
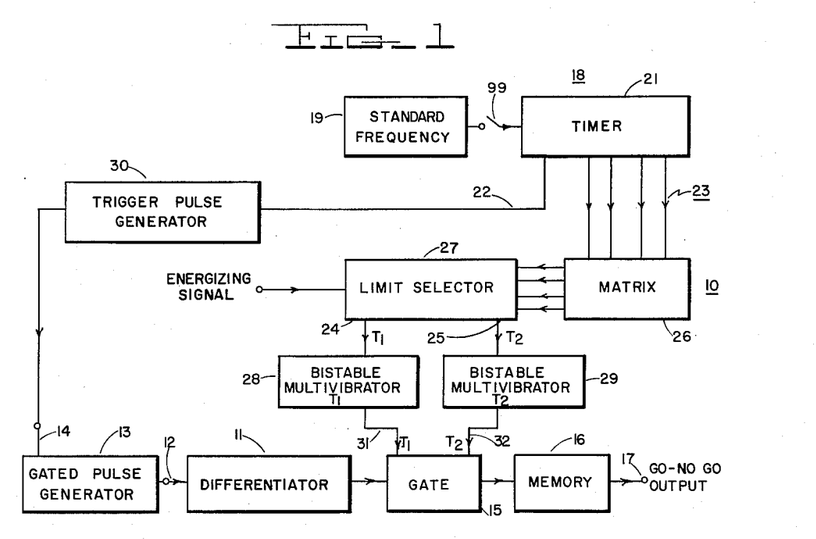
Fig. 1 is a block diagram schematically showing the preferred embodiment of my invention.

Referring now to Fig. 1, the improved pulse width evaluating system of my invention, shown in block diagram form at 10, comprises a differentiating circuit 11 having its input circuit 12 adapted to be connected to the source 13 of pulses the width of which is to be evaluated; in the embodiment of Fig. 1, pulse generator 13 is of the gated type such as a monostable multivibrator, i.e., one in which its output pulse is initiated in response to a trigger pulse impressed on its input circuit 14. Differentiating circuit 11 is arranged to differentiate at least the trailing edge of the pulse provided by the pulse generator 13, and is coupled to gate circuit 15 which in turn is coupled to memory circuit 16, which provides the "Go" or "No-Go" output signal at output terminal 17. Timing means 18 are provided which, in the illustrated embodiment, comprises a source 19 of standard frequency, such as 400 cycles per second, coupled to a frequency counting circuit 21, which may be a binary-type counting chain, as will be hereinafter more fully described. Timer 21 has an output circuit 22 coupled to trigger pulse generator 30 which supplies a single trigger pulse to the trigger pulse input circuit 14 of pulse generator 13 for providing the pulse-initiating trigger pulse thereto. Timer 21 further has a plurality of count-indicating or timing signal output circuits generally indicated at 23. First and second predetermined timing or limit pulses are provided in circuits 24 and 25, respectively, by a suitable switching arrangement selectively connecting the circuits 24 and 25 to the count-indicating output circuits 23 of timer 21. Such a switching system is shown here as including a suitable matrix 26 and a selector circuit 27; the switching system for selecting the desired timing pulses from those available at timer 21 does not form a part of my present invention, and any suitable switching system well known in the art may be employed; a diode matrix and line selector of the type described and illustrated in my co-pending application Serial Number 820,049, filed June 12, 1959, and assigned to the assignee of the present application, may be employed for the matrix 26 and the limit selector 27. The first and second timing signal circuits 24 and 25 are respectively coupled to the input circuits of bistable multivibrators 28 and 29, which in turn have their output circuits coupled to the gating signal input circuits 31 and 32 of gate circuit 15.

Figure 4:
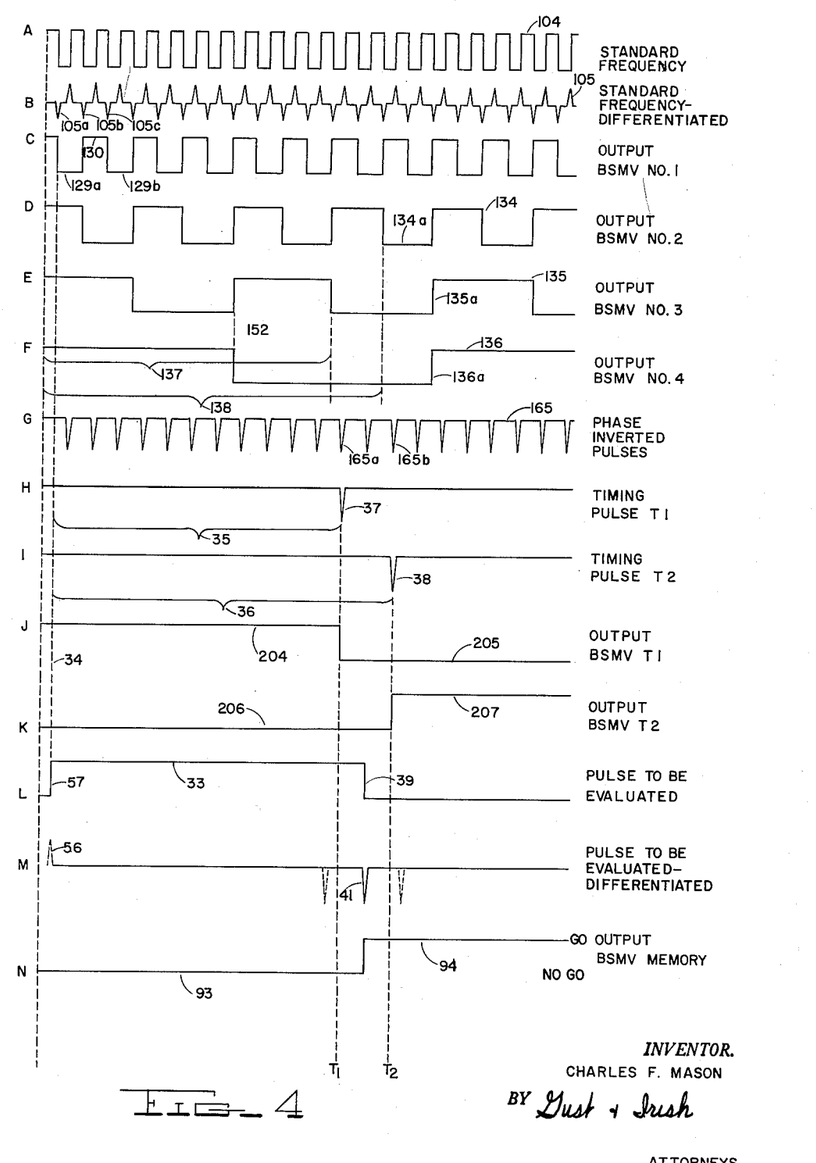
Fig. 4 illustrates waveforms found in the system of the previous figures for one specific set of tolerance limits.

Referring now additionally to Fig. 4I, J, L, M and N, the mode of operation of the system thus far described involves the initiation of pulse 33, the width of which is to be evaluated by a trigger pulse provided by trigger pulse generator 30 responsive to a pulse from timer 21 at a time indicated by dashed line 34 in Fig. 4, and the initiation of two time delays 35 and 36 coincident with the leading edge of the pulse 33, the width of which is to be evaluated. The first time delay 35 is set for the minimum acceptable width of pulse 33 and the second time delay 36 is likewise set for the maximum permissible width of pulse 33; time delay 35 and 36 are selected by switching system 26, 27 from the time delays provided by timer 21. Time delays 35 and 36 respectively generate timing pulses 37 and 38 at the end of their respective delays, timing pulses 37 and 38 in turn being employed to trigger bistable multivibrator memory circuits 28 and 29.

Gate circuit 15 is normally closed until the first multivibrator 28 is triggered by timing pulse 37 and remains open only until the second multivibrator 29 is triggered by timing pulse 38; gate circuit 15 is thus open only during the time interval when the trailing edge 39 of pulse 33 can occur within the desired tolerance limits. The trailing edge 39 of the pulse 33 is differentiated by differentiating circuit 11 to provide a differentiated pulse 41 which is fed to the gate circuit 15. Thus, if the gate circuit 15 is open when the differentiated pulse 41 occurs, differentiated pulse 41 passes through and is impressed on memory circuit 16, which, as will be hereinafter more fully described, is preferably another bistable multivibrator. Thus, as indicated, if gate circuit 15 is open when differentiated pulse 41 occurs, pulse 41 triggers multivibrator circuit 16, thus switching it from one stable state to the other. However, if the differentiated pulse 41 arrives at the gate circuit 15 either before the end of time delay 35, i.e., before timing pulse 37, or after the expiration of time delay 36, i.e., after timing pulse 38, gate circuit 15 will be closed and thus pulse 41 cannot pass through gate circuit 15. Thus, under these circumstances, the multivibrator memory circuit 16 will remain in its original stable state. It will now be readily seen that with this system, memory circuit 16 provides two output signal levels, one responsive to the trailing edge 39 of pulse 33 occurring in the interval between the end of time delay 35 and time delay 36, i.e., within tolerance, the other indicating that the trailing edge 39 of the pulse 33 did not occur in the interval between timing pulses 37 and 38, identified as T1 and T2. The memory circuit 16 may be examined either immediately after generation of pulse 33, or at some later time, its state indicating whether the width of the pulse 33 was within or outside of the desired tolerance limits.

Figure 2:
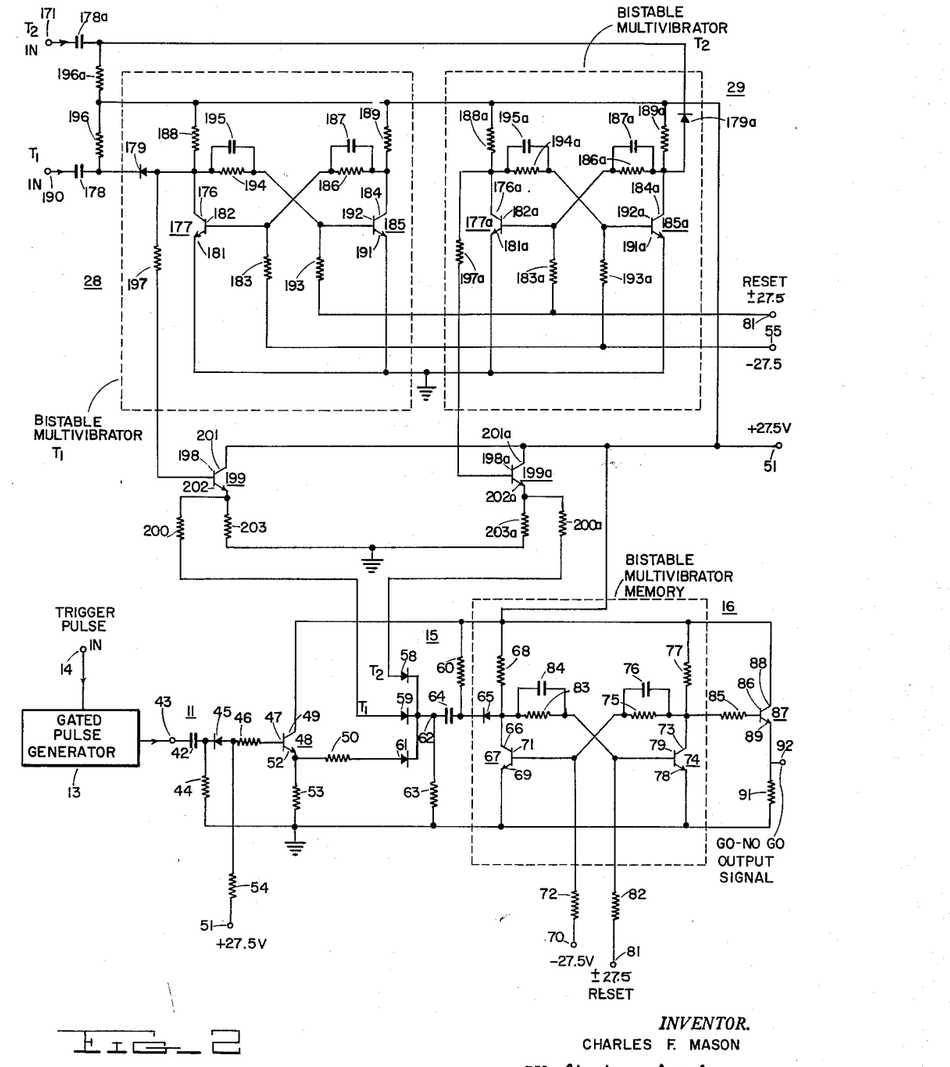
Fig. 2 is a schematic illustration of a part of the system of Fig. 1.
Figure 3:
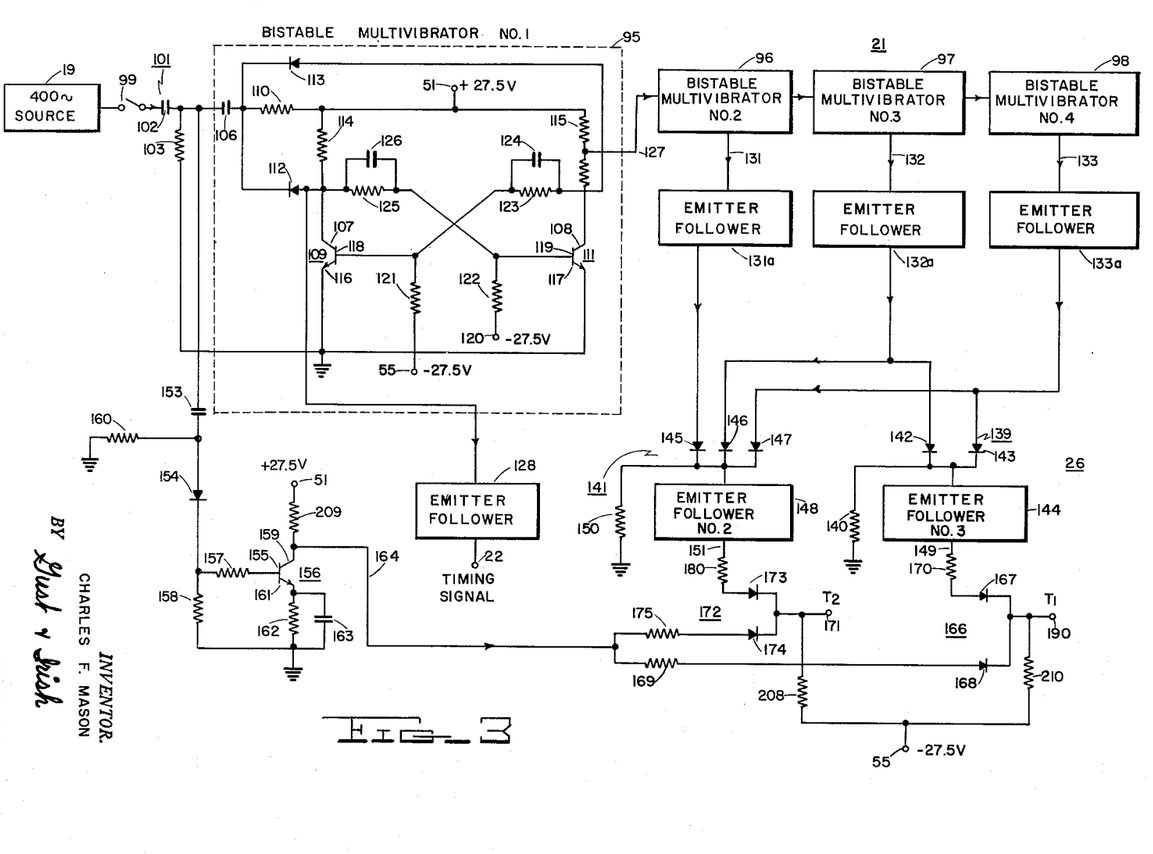
Fig. 3 is a schematic illustration of the remainder of the system of Fig. 1.

Referring now to Figs. 2 and 3, differentiating circuit 11 is formed in the conventional manner by a suitable capacitor 42 coupled in series with output circuit 43 of pulse generator 13 with a suitable resistor 44 connecting the terminal of capacitor 42 remote from pulse generator 13 to ground, as shown. A suitably polarized diode 45 and a resistor 46 serially connect capacitor 42 to base 47 of transistor 48. Collector 49 of transistor 48 is connected to a suitable source 51 of positive potential such as +27.5 volts with emitter 52 being connected to ground by emitter-resistor 53. Base bias for transistor 48 is provided by resistor 54 which connects a point intermediate diode 45 and resistor 46 to a suitable source 51 of bias potential, such as +27.5 volts. Referring now briefly to Fig. 4L and N, the input pulse 33 to be evaluated is fed from pulse generator 13 to the differentiating circuit 11 which provides a positive-going differentiated pulse, shown in dashed lines at 56, coincident with the leading edge 57 of pulse 33, and a negative-going differentiated pulse 41 coincident with the trailing edge 39 of pulse 33. In the present embodiment, however, the positive-going pulse 56 has not been utilized, diode 45 being polarized so as to pass only the negative-going trailing differentiated pulse 41.

Gate circuit 15 is shown as a coincidence or AND circuit, comprising diodes 58, 59 and 61. Diode 61 is connected to emitter 52 of transistor 48 by resistor 50 and to output point 62 which is also connected to ground by resistor 63. It will now be seen that transistor 48 is employed in an emitter-follower circuit. It will further be seen that transistor 48 is normally conducting and thus that an appreciable voltage drop occurs across resistor 53. With emitter 52 of transistor 48 being positive with respect to ground in the absence of an input pulse 41, current will also flow to ground through diode 61 and resistor 63 so that point 62 is, under these circumstances, also at an elevated potential above ground.

Output point 62 of the gate circuit 15 is coupled to the input circuit of bistable multivibrator memory circuit 16 by coupling capacitor 64 and diode 65 which serially connect output point 62 to the collector 66 of transistor 67; the midpoint between capacitor 64 and diode 65 is connected to the positive source of potential 51 by resistor 60. Collector 66 of transistor 67 is connected to the positive source of potential 51 by resistor 68 and emitter 69 is connected to ground as shown. Base 71 of transistor 67 is connected to the −27.5 volt source 70 by resistor 72 and is also connected to collector 73 of the other transistor 74 of bistable multivibrator memory circuit 16 by resistor 75 having capacitor 76 connected thereacross. Collector 73 of transistor 74 is likewise connected to the positive 27.5 volt source 51 by resistor 77, with emitter 78 being directly connected to ground, as shown. Base 79 of transistor 74 is connected to a resetting signal input terminal 81 by resistor 82 and to the collector 66 of transistor 67 by resistor 83 having capacitor 84 connected thereacross. The multivibrator 16 must be reset by applying first 27.5 volts to terminal 81 and then returning terminal 81 to −28 for the remainder of the test.

It will be seen that with the circuitry shown, bistable multivibrator memory circuit 16 is arranged so that transistor 74 is normally conducting and transistor 67 is non-conducting. Diode 65 is polarized to pass the negative-going differentiated pulse 41 from gate circuit 15, and thus when pulse 41 is impressed on the collector 66 of transistor 67, bistable multibrator 16 is caused to switch from one off its stable states to its other stable state. The output from bistable multivibrator 16 is taken from collector 73 of transistor 74, collector 73 being serially connected by resistor 85 to base 86 of transistor 87, which has its collector 88 connected to the positive 27.5 volt source 51 and which has its emitter 89 connected to ground by resistor 91. Emitter 89 of transistor 87 is connected to output terminal 92 and it will thus be seen that transistor 87 is also connected in an emitter-follower circuit. It is thus seen that in the absence of a differentiated pulse 41 being impressed on bistable multivibrator memory circuit 16 and with transistor 74 normally conducting, an appreciable voltage drop will occur across resistor 77 and thus collector 73 of transistor 74 will be at a relatively low potential, thus providing a first output signal level 93 on output terminal 92, as shown in Fig. 4N. However, when differentiated pulse 41 is impressed on the input of bistable multivibrator 16, the base 79 of transistor 74 is driven negative, thus cutting-off transistor 74 and in turn turning on transistor 67, as is well known in the art. Thus, with transistor 74 cut-off, the potential of its collector 73 rises substantially, thus in turn providing the second output signal level 94 at output terminal 92 of the emitter-follower circuit 87, as shown in Figs. 2 and 4. Thus, as will be readily comprehended from inspection of Fig. 4N, presence at the output terminal 92 of a lower potential level 93 following generation of pulse 33 by pulse generator 13 provides a "No-Go" indication that the pulse 33 was not within the desired tolerance limits, whereas presence at the output terminal 92 of an upper potential level 94 provides a "Go" indication, i.e., that the width of pulse 33 was within the desired tolerance limits, i.e., that its trailing edge 33 occurred between times T1 and T2, following initiation of the pulse.

In order to provide timing pulses 37 and 38 at the ends respectively of the predetermined time delays 35 and 36, the arrangement now to be described is provided (referring specifically to Fig. 3). Here, standard frequency source 19 is shown as being a conventional 400 cycle source, such as a tuning fork oscillator, which has had its output suitably shaped to provide substantially square pulses 104, as shown in Fig. 4A. Timer 21 is shown as being formed as a binary counting chain comprising four bistable multivibrators 95, 96, 97 and 98; only bistable multivibrator 95 is shown in detail, since the circuitry is conventional and it will be readily understood that the remaining multivibrators 96 through 98 are identical. Standard frequency source 19 is coupled to the input circuit of the first bistable multivibrator 95 by means of suitable switching apparatus, shown schematically at 99, which may form a part of the programming system (otherwise not shown), and a differentiating circuit 101 comprising a serially connected capacitor 102 with resistor 103 connecting the terminal of capacitor 102 remote from source 19 to ground, as shown. Differentiating circuit 101 differentiates the output pulses 104 provided by standard frequency source 19 to form differentiated pulses 105, as shown in Figs. 4A and B. Capacitor 102 of differentiating circuit 101 is in turn coupled to multivibrator 95 by serially connected coupling capacitor 106 which in turn is connected to the collectors 107 and 108 of transistors 109 and 111 by similarly polarized diodes 112 and 113, as shown. Diodes 112 and 113 are polarized to block the positive-going differentiated peaks 105 so that only the negative-going peaks are impressed upon multivibrator 95. Collectors 107 and 108 of transistors 109 and 111 are respectively connected to the positive 27.5 volt source 51 by resistors 114 and 115 with emitters 116 and 117 being connected to ground, as shown. Diode bias resistor 110 connects source 51 to diodes 112 and 113 as shown. The base 118 of transistor 109 is connected to the −27.5 volt source 55 by resistors 121. The base 119 of transistor 111 is connected to resetting terminal 120 to which −27.5 volts is normally connected, but to which +27.5 volts is momentarily applied when it is desired to reset multivibrator 95 (and multivibrators 96, 97 and 98) to initiate a new count. Base 118 of transistor 109 is also connected to collector 108 of transistor 111 by resistor 123 having capacitor 124 connected in parallel therewith while base 119 of transistor 111 is connected to the collector 107 of transistor 109 by resistor 125 having capacitor 126 in parallel therewith. Circuit 127 taken from a point on resistor 115 couples multivibrator 95 to the input circuit of bistable multivibrator 96. In the illustrated embodiment, timing pulses are obtained from multivibrator 96 from collector 107 of transistor 109, being fed to output circuit 22 through emitter-follower circuit 128. In the illustrated embodiment, transistor 111 is normally conducting and transistor 109 is normally cut-off in the absence of a negative-going input pulse being impressed thereon. As is well understood in the art, impression of the first negative-going differentiated pulse 105a on the input circuit of bistable multivibrator 95 causes transistor 109 to be turned on, thereby providing a first negative-going pulse 129a to emitter follower 128. It will further be readily apparent that the next negative-going input pulse 105b resets multivibrator 95, thereby providing positive-going output pulse 130 and that the third negative-going input pulse again triggers multivibrator 95 to provide negative-going pulse 129b. Bistable multivibrator 95 thus in essence divides the frequency of the input pulses 104 in half, as shown in Fig. 4C. Multivibrator 95 is coupled to multivibrator 96 by circuit 127 so that pulses which are the inverse of those shown in Fig. 4C are impressed on multivibrator 96. Thus, the second pulse impressed on multivibrator 96 is negative-going and therefore triggers multivibrator 96 to provide the output pulses in its output circuit 131 as shown in Fig. 4D. Likewise, bistable multivibrators 97 and 98 function in an identical manner successively to divide the frequency of their input pulses in half, as shown in Fig. 4E and F.

The first timing pulse triggers pulse generator 30, which may be a bistable multivibrator, which in turn provides a single trigger pulse to input circuit 14 of pulse generator 13. It will be seen that only one trigger pulse should be provided to pulse generator 13 before the maximum time limit of pulse 33; if the timing pulses from bistable multivibrator 95 were directly applied to pulse generator 13 and if pulse generator 13 supplied a pulse 33 shorter than the minimum tolerance limit for the trailing edge, pulse generator 13 would be retriggered by the next timing signal following the trailing edge of pulse 33 thus giving an erroneous indication.

Each of the bistable multivibrators 96, 97 and 98 are provided with output circuits 131, 132 and 133, respectively, including emitter-follower circuits 131a, 132a and 133a, in which the output pulses 134, 135 and 136 shown in Fig. 4D, E and F, respectively, are provided. It will now be readily seen that a wide range of time delays can be selected from the output pulses 129, 134, 135 and 136 from bistable multivibrators 95, 96, 97 and 98 by appropriate selection of the times of coincidence of pulses of the same polarity in two or more of the output circuits of the bistable multivibrators forming the counting chain 21. Thus, it is seen that one time delay period 137 is provided at the time of the first coincidence of negative-going pulses 135a and 136a in the outputs of multivibrators 97 and 98 and that another time delay 138 is provided at the time of the first coincidence of negative-going pulses 134a 135a and 136a in the outputs of bistable multivibrators 96, 97 and 98. Timing pulses responsive to these two time delays, or any other similarly selected time delays, may thus be provided by the provision of coincidence AND circuits 139 and 141; coincidence circuits 139 and 141 are shown in Fig. 3 as providing the specific time delays 137 and 138, it being readily understood that other time delays can be appropriately established by rearrangement of the coincidence circuits 139 and 141 in matrix 26, as is well known in the art. In the specific illustrated embodiment of Fig. 3, coincidence circuit 139 is formed by two similarly polarized diodes 142 and 143 serially connected respectively in the output circuits 132 and 133 of bistable multivibrators 97 and 98 and being connected to ground by resistor 140 and to a common emitter-follower 144 which may have the same circuitry as the emitter-followers 48 and 87 of Fig. 2. Likewise, coincidence circuit 141 is formed of three similarly polarized diodes 145, 146 and 147 serially connected with output circuits 131, 132 and 133 of bistable multivibrators 96, 97 and 98 and connected to ground by resistor 150 and to a common emitter follower 148. Thus, as is well understood in the art, by virtue of the coincidence or AND circuit 139, emitter-follower 144 will provide in its output circuit 149, a negative-going timing pulse coincident with the end of time delay 137 in Fig. 4, whereas emitter-follower 148 by virtue of the coincidence or AND circuit 141 will provide in its output circuit 151 a negative-going timing pulse coincident with the end of time delay 138 of Fig. 4.

Inspection of Figs. 4E and F will reveal that at the instant indicated by the dashed line 152, it is possible that output signal 136 from bistable multivibrator 98 may have gone negative an instant before the output signal 135 from bistable multivibrator 97 went positive. Thus, it is a possibility that for a finite but very short instant, both the signals 135 and 136 from the bistable multivibrators 97 and 98 may be negative simultaneously, this condition in turn being detected by the AND circuit 139 to provide an erroneous or redundant timing pulse in the output circuit 149 of emitter-follower 144; the same condition can exist at the same time 152 in the case of the output signals 134, 135 and 136 from bistable multivibrators 96, 97 and 98, thus providing the possibility of a premature output signal in output circuit 151 from emitter-follower 148. Other possibilities for such redundancies will be readily apparent. In order to eliminate such redundancies, the arrangement now to be described is provided. Here, a coupling capacitor 153 and diode 154 are serially connected to capacitor 102 with resistor 160 connecting their midpoint to ground, as shown, and with diode 154 being polarized oppositely from diodes 112 and 113, and thus passing the positive peaks in the differentiated signal 105 from the differentiating circuit 101. Diode 154 is connected to base 155 of transistor 156 by a resistor 157, diode 154 also being connected to ground by resistor 158. Collector 159 of transistor 156 is connected to the positive 27.5 volt source of potential 51 by resistor 209 while emitter 161 is connected to ground by resistor 162 having capacitor 163 connected in parallel therewith. Output circuit 164 is connected to collector 159 and it will now be observed that transistor 156 is connected in an amplifier and phase inverter circuit thus providing amplified and phase inverted pulses 165 as shown in Fig. 4G, pulses 165 being in phase with the positive going peaks of the differentiated pulses 105, but being phase inverted with respect thereto. Output circuit 164 of the amplifier-phase inverter circuit 156 and output circuit 149 of emitter-follower 144 are connected to the minimum limit timing pulse output terminal 190 by coincidence or AND circuit 166; output terminal 190 is connected to output circuit 149 of emitter-follower 144 by serially connected diode 167 and resistor 170 and to output circuit 164 by serially connected diode 168 and resistor 169. Likewise, output circuit 164 of the amplifier-phase inverter 156 and output circuit 151 of emitter-follower 148 are connected to the maximum time limit pulse output terminal 171 by coincidence or AND circuit 172; output terminal 171 is connected to output circuit 151 of emitter-follower 148 by serially connected diode 173 and resistor 180 and to the output circuit 164 by similarly polarized diode 174 and serially connected resistor 175. Output terminals 171 and 190 are respectively connected to −27.5 volt source of potential 55 by resistors 208 and 210, as shown.

It will now be seen that by virtue of the provision of AND circuits 166 and 172, in order for minimum and maximum time limit pulses to be provided at output terminals 190 and 171, the timing signals provided in output circuits 149 and 151 of emitter-followers 144 and 148 must respectively find coincidence with the phase inverted pulse 165. Inspection of Fig. 4 will now clearly reveal that at the time indicated by the dashed line 152 at which such redundant timing pulses could be provided, there is no coincidence with phase inverted pulses 165, and thus, even though erroneous timing pulses may have been provided in output circuits 149 and 151 of emitter-followers 144 and 148, no time limit pulses will be provided in output terminals 190 and 171. However, immediately following the time indicated by the dashed line 137, a phase inverted pulse 165a occurs which is coincident with the pulse in output circuit 149 of emitter-follower 144 resulting from the coincidence of negative-going pulses 135a and 136a, and thus timing pulse 37 will be provided at output terminal 165. Likewise, immediately following the time indicated by the dashed line 138, another phase inverted pulse 165b will occur which will find coincidence with the pulse in output circuit 151 of emitter-follower 148 resulting from coincidence of the negative-going pulses 134a, 135a and 136a, thus providing maximum time limit pulse 38 at output terminal 171.

Referring now specifically to Fig. 2, the minimum time limit bistable multivibrator 28 has collector 176 of its transistor 177 connected to minimum time limit pulse terminal 190 by serially connected coupling capacitor 178 and diode 179, with emitter 181 being connected to ground as shown. Base 182 of transistor 177 is connected to the −27.5 volt source of potential 55 by resistor 183 and to the collector 184 of the other transistor 185 by resistor 186 having capacitor 187 connected in parallel thereacross. Collectors 176 and 184 of transistors 177 and 185 are connected to the positive 27.5 volt source of potential 51 by resistors 188 and 189 respectively with emitter 191 of transistor 185 being connected to ground. Base 192 of transistor 185 is in turn connected to the reset terminal 81 by resistor 193 and to the collector 176 of transistor 177 by resistor 194 with capacitor 195 connected thereacross. The point intermediate coupling capacitor 178 and diode 179 is also connected to the positive 27.5 volt source of potential 51 by resistor 196. The output from the minimum time limit bistable multivibrator 28 is taken from collector 176 of transistor 177 by means of resistor 197 which is connected to the base 198 of emitter-follower transistor 199. Collector 201 of transistor 199 is connected to the positive 27.5 volt source of potential 51 with emitter 202 being connected to ground by resistor 203. Emitter 202 of emitter-follower transistor 199 is connected to diode 59 of coincidence or AND circuit 15 by resistor 200.

It will be seen that transistor 185 of the minimum time limit bistable multivibrator T1 is normally conducting with transistor 177 thus being normally cut-off, and therefore with its collector 176 being at an elevated potential. Thus, prior to receipt of timing pulse 37, emitter-follower circuit 199 provides an output signal level 204 (Fig. 4J) on diode 59 of the coincidence or gate circuit 15. However, when the negative-going minimum time limit pulse 37 is impressed on bistable multivibrator 28, transistor 185 is cut-off and transistor 177 is in turn rendered conductive as is well known in the art, thus causing the level of the output signal from emitter follower 199 to fall to level 205, as shown in Fig. 4J.

The maximum time limit bistable multivibrator 29 is identical to bistable multivibrator 28 with its elements being indicated by the suffix indication "a." Here, however, the maximum time limit pulse output terminal 171 is coupled to collector 184a of transistor 185a by coupling capacitor 178a and diode 179a, and the output circuit is taken from collector 176a of transistor 177a. The point intermediate coupling capacitor 178a and diode 179a is also connected to the positive 27.5 volt source of potential 51 by resistor 196a. Thus, resistor 197a connects collector 176a of transistor 177a to the base 198a of emitter-follower transistor 199a, with emitter 202a of emitter-follower transistor 199a being connected by resistor 200a to diode 58 of the gate or coincidence circuit 15 and further being connected to ground by resistor 203a, and the reset is connected to transistor 176a rather than to 184a. It is thus seen that in the case of the maximum time limit bistable multivibrator 29, transistor 177a is normally conductive and thus that a lower output level 206 is provided from emitter-follower 199a prior to timing pulse 38. Impression of the upper time limit pulse 38 on bistable multivibrator 29 cuts-off transistor 177a and turns on transistor 185a, thus providing an upper level output signal 207 from the emitter follower 199a. It is thus seen with particular reference to Fig. 4J and K that bistable multivibrators 28 and 29 are in opposite stable states prior to the lower limit timing pulse 37 and subsequent to the upper limit timing pulse 38, and are in the same stable state in the interval between the two timing pulses 37 and 38.

It will now be seen that prior to the occurrence of lower time limit pulse 37 (and assuming that differentiated pulse 41 occurs between timing pulses 37 and 38) both diodes 61 and 59 of AND circuit 15 are conducting. On the occurrence of lower time limit pulse 37, bistable multivibrator 28 is switched from its first stable state to a second stable state, providing output in output signal level 205 which thus terminates conduction in diode 59, it being observed that until the occurrence of the upper time limit pulse 38, the output signal of bistable multivibrator 29 is at its lower level 206, and thus that diode 58 is not yet conducting. Thus, immediately following the occurrence of the lower time limit pulse 37, both diodes 58 and 59 of gate circuit 15 are cut off. However, until the occurrence of differentiated pulse 41, transistor 48 is conducting and thus diode 61 is conducting. However, when the differentiated pulse ocurs, thereby cutting-off transistor 48 and terminating conduction of diode 61, it is seen that all three doides 58, 59 and 61 are cut-off, thus terminating the current flow through resistor 63 thus providing a corresponding negative-going voltage pulse on the input ciricut of bistable multivibrator 16 causing it to switch from its first stable state in which it provided an output signal level 93 to its second stable state in which it provides an output level 94.

Figure 5:
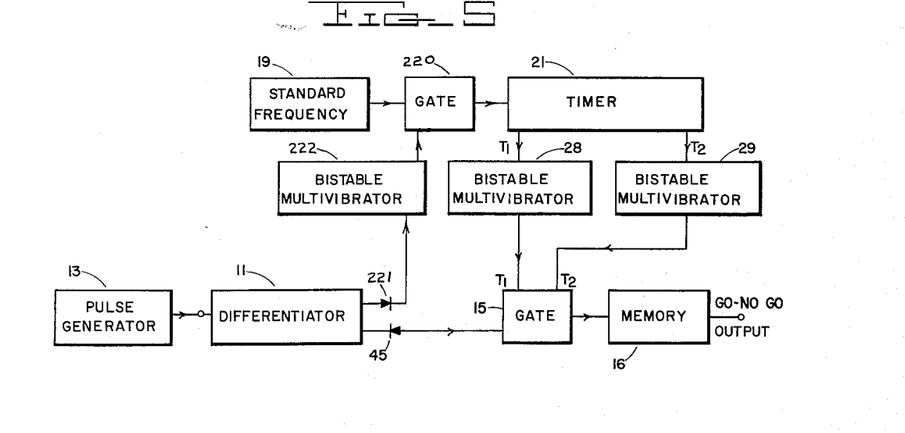
Fig. 5 is a block diagram schematically illustrating a modified form of my invention.

It will be observed that in the embodiment thus far described, closing of switch 99 connecting standard frequency source 19 to the timer 21 initiates a series of timing pulses, the first of which triggers trigger pulse generator 30 which in turn triggers pulse generator 13 to initiate the pulse 33 the width of which is to be evaluated. It will be readily comprehended that the system may be simply rearranged, as shown in Fig. 5, so that the leading edge 57 of pulse 33 initiates the counting operation of timer 21 and thus the two delay periods 35 and 36. Thus, referring briefly to Fig. 5 in which like elements are indicated by like reference numerals, it is seen that the positive-going differentiated pulse 56 coincident with the leading edge 57 of pulse 33 from pulse generator 13 is utilized, differentiating circuit 11 being coupled to a suitable gate circuit 220 interposed between standard frequency source 19 and timer 21 by a suitable diode 221 polarized oppositely from diode 45 which couples pulse generator 13 to an emitter-follower 48, and by bistable multivibrator 222, gate 220 is thus opened responsive to differentiated pulse 56 and remains open until multivibrator 206 is reset. It will be readily appreciated that the positive-going pulse 56 coincident with the leading edge 57 of pulse 33 can be caused to open gate 220 thus allowing pulses 104 from the standard frequency source 19 to pass to the timer 21 thus initiating the pulse counting operation thereof and the time delays 35 and 36. In the embodiment shown in Fig. 5, the matrix and limit selector 26 and 27 shown in Fig. 1 are not shown, it being readily understood that fixed time delays and thus lower and upper time limit pulses can be provided in the manner shown in Fig. 3, if desired.

It will readily be seen that other types of timing devices, such as analog delay devices, may be equally advantageously employed in my invention. Further, while a timing device is shown which simultaneously initiates two time delays for opening and closing the gate, it will readily be seen that a gating signal of predetermined duration can be provided after a predetermined time delay with the gate being open only responsive to and during the gating signal.

It will now readily be seen that my improved pulse width evaluating circuit provides very fast operation with digital accuracy and that it can be employed to evaluate pulses of any width from extremely short to extremely wide. It will further be seen that a Go/No-Go type of output is provided with the result of the evaluation being stored so that it can be read-out at any time after the evaluation is completed. It will further be observed that my improved system can be completely transistorized, thus employing all static components, with an accompanying low power consumption. It will also be seen that the pulse width tolerances, i.e., upper and lower limit times, can readily be changed and that the selection of such times lends itself to programming through the employment of suitable switching systems.

While I have described above the principles of my invention in connection with specific apparatus, it is to be clearly understood that this description is made only by way of example and not as a limitation to the scope of my invention.

What is claimed is:

1. A pulse width evaluating system comprising: an input circuit for receiving an input pulse to be evaluated and including means for differentiating at least the trailing edge of said input pulse; gating means coupled to said input circuit, said gating means being normally closed and having means for opening the same thereby to pass said differentiated trailing edge responsive to a first gating signal and for reclosing the same responsive to a second gating signal; timing means having means for initiating a timing period coincident with the leading edge of said input pulse, said timing means having means providing first and second timing signals respectively after first and second predetermined time delays following initiation of said timing period; means coupling said timing means to said gating means for respectively providing said first and second gating signals responsive to said timing signals whereby said differentiated trailing edge of said input pulse is passed by said gating means only when the same occurs between said timing signals; and memory means coupled to said gating means and having an output circuit, said memory means having means providing a first level output signal when no signal has been passed by said gating means and a second level output signal responsive to passage of said differentiated trailing edge of said input pulse by said gating means thereby indicating whether the width of said input pulse is within the tolerance established by said predetermined time delays.

2. A pulse width evaluating system comprising: an input circuit for receiving an input pulse to be evaluated and including means for differentiating at least the trailing edge of said input pulse; gating means coupled to said input circuit, said gating means being normally closed and having means for opening the same thereby to pass said differentiated trailing edge responsive to a first gating signal and for reclosing the same responsive to a second gating signal; timing means having means for initiating a timing period coincident with the leading edge of said input pulse, said timing means having means including first and second output circuits for respectively providing first and second timing signals after predetermined time delays following initiation of said timing period; first and second bistable means respectively coupling said timing means output circuit to said gating means for respectively providing said first and second gating signals responsive to said timing signals whereby said differentiated trailing edge of said input pulse is passed by said gating means only when the same occurs between said timing signals; and memory means coupled to said gating means and having an output circuit, said memory means having means providing a first level output signal when no signal has been passed by said gating means and a second level output signal responsive to passage of said differentiated trailing edge of said input pulse by said gating means thereby indicating whether the width of said input pulse is within the tolerance established by said predetermined time delays.

3. A pulse width evaluating system comprising: an input circuit for receiving an input pulse to be evaluated and including means for differentiating at least the trailing edge of said input pulse; gating means coupled to said input circuit, said gating means being normally closed and having means for opening the same thereby to pass said differentiated trailing edge responsive to a first gating signal and for reclosing the same responsive to a second gating signal; timing means having means for initiating a timing period coincident with the leading edge of said input pulse, said timing means having means providing first and second timing signals respectively after first and second predetermined time delays following initiation of said timing period; means coupling said timing means to said gating means for respectively providing said first and second gating signals responsive to said timing signals whereby said differentiated trailing edge of said input pulse is passed by said gating means only when the same occurs between said timing signals; and bistable means providing a first level output signal when no signal has been passed by said gating means and a second level output signal responsive to passage of said differentiated trailing edge of said input pulse by said gating means thereby indicating whether the width of said input pulse is within the tolerance established by said predetermined time delays.

4. A pulse width evaluating system comprising: an input circuit for receiving an input pulse to be evaluated and including means for differentiating at least the trailing edge of said input pulse; gating means coupled to said input circuit, said gating means having first and second gating signal input circuits, said gating means being normally closed and having means for opening the same thereby to pass said differentiated trailing edge responsive to a first gating signal and for reclosing the same responsive to a second gating signal; timing means having means for initiating a timing period coincident with the leading edge of said input pulse, said timing means having means including first and second output circuits for respectively providing first and second timing signals after predetermined time delays following initiation of said timing period; first and second bistable multivibrators respectively coupling said timing means output circuits to said gating signal input circuits for respectively providing said first and second gating signals responsive to said timing signals whereby said differentiated trailing edge of said input pulse is passed by said gating means only when the same occurs between said timing signals; and a third bistable multivibrator coupled to said gating means and having an output circuit, said third bistable multivibrator providing a first level output signal when no signal has been passed by said gating means and a second level output signal responsive to passage of said differentiated trailing edge of said input pulse by said gating means thereby indicating whether the width of said input pulse is within the tolerance established by said predetermined time delays.

5. A pulse width evaluating system comprising: an input circuit for receiving an input pulse to be evaluated and including means for differentiating at least the trailing edge of said input pulse; timing means having means for initiating a timing period coincident with the leading edge of said input pulse, said timing means having means including first and second output circuits for respectively providing first and second timing pulses after predetermined time delays following initiation of said timing period; first and second bistable multivibrators each having input and output circuits with their input circuits respectively coupled to said timing means output circuits and being respectively adapted to be switched from one stable state to the other stable state responsive to said timing pulses, said multivibrator input and output circuits being respectively coupled to said multivibrators so that the same are in opposite stable states before said first timing pulse and after said second timing pulse and in the same stable state between said timing pulses; a third bistable multivibrator having input and output circuits; and a coincidence circuit coupling said pulse input circuit and said first and second bistable multivibrator output circuits to said third multivibrator input circuit and arranged so that said differentiated trailing edge of said input pulse is impressed on said said third bistable multivibrator only when the same occurs when said first and second bistable multivibrators are in the same stable state whereby said third bistable multivibrator is switched from one of its stable states to the other when the width of said input pulse is within the tolerance established by said predetermined time delays.

6. A pulse width evaluating system for use with a gated pulse generator, said system comprising: an input circuit adapted to be coupled to said pulse generator for receiving an input pulse to be evaluated therefrom, said input circuit including means for differentiating at least the trailing edge of said input pulse; gating means coupled to said input circuit, said gating means being normally closed and having means for opening the same thereby to pass said differentiated trailing edge responsive to a first gating signal and for reclosing the same responsive to a second gating signal; timing means having means including a trigger signal output circuit adapted to be coupled to said pulse generator for supplying a trigger signal thereto thereby initiating the input pulse to be evaluated, said timing means having means providing first and second timing signals after first and second predetermined time delays following said trigger signal; means coupling said timing means to said gating means for respectively providing said first and second gating signals responsive to said timing signals whereby said differentiated trailing edge of said input pulse is passed by said gating means only when the same occurs between said timing signals; and memory means coupled to said gating means and having an output circuit, said memory means having means providing a first level output signal when no signal has been found by said gating means and a second level output signal responsive to passage of said differentiated trailing edge of said input pulse by said gating means thereby indicating whether the width of said input pulse is within the tolerance established by said predetermined time delays.

7. A pulse width evaluating system comprising: an input circuit for receiving an input pulse to be evaluated and including means for differentiating at least the trailing edge of said input pulse; gating means coupled to said input circuit, said gating means being normally closed and having means for opening the same thereby to pass said differentiated trailing edge responsive to a first gating signal and for reclosing the same responsive to a second gating signal; timing means coupled to said input circuit for initiating a timing period responsive to the leading edge of said input pulse, said timing means having means providing first and second timing signals respectively after first and second predetermined time delays following initiation of said timing period; means coupling said timing means to said gating means for respectively providing said first and second gating signals responsive to said timing signals whereby said differentiated trailing edge of said input pulse is passed by said gating means only when the same occurs between said timing signals; and memory means coupled to said gating means and having an output circuit, said memory means having means providing a first level output signal when no signal has been passed by said gating means and a second level output signal responsive to passage of said differentiated trailing edge of said input pulse by said gating means thereby indicating whether the width of said input pulse is within the tolerance established by said predetermined time delays.

8. A pulse width evaluating system comprising: an input circuit for receiving an input pulse to be evaluated and including means for differentiating at least the trailing edge of said input pulse; gating means coupled to said input circuit, said gating means having first and second gating signal input circuits, said gating means being normally closed and having means for opening the same thereby to pass said differentiated trailing edge responsive to a first gating signal and for reclosing the same responsive to a second gating signal; timing means comprising a source of standard frequency pulses and including means for differentiating said standard frequency pulses, binary pulse counting means having a pulse input circuit coupled to said standard frequency source by means for passing only pulses of one polarity so that said pulse counting means counts down said one polarity pulses, means for initiating a pulse-counting operation coincident with the leading edge of said input pulse, said pulse counting means having first and second output circuits for respectively providing first and second output signals after predetermined time delays following initiation of said pulse-counting operation; a phase inverting circuit coupled to said standard frequency source having means for passing only pulses having a polarity opposite from said one polarity and for phase inverting the same; first and second bistable multivibrators respectively having input and output circuits; first and second coincidence circuits respectively coupling said phase inverting circuit and said first and second counting means output circuits to the input circuits of said multivibrators whereby first and second timing signals are respectively impressed on said multivibrators responsive only to respective coincidence of said first and second counting means output signals and said phase inverted signals, said multivibrators having their output circuits respectively coupled to said gating means input circuits whereby said first and second gating signals are provided respectively responsive to said first and second timing signals so that said differentiated trailing edge of said input pulse is passed by said gating means only when the same occurs between said timing signals; and memory means coupled to said gating means and having an output circuit, said memory means having means providing a first level output signal when no signal has been passed by said gating means and a second level output signal responsive to passage of said differentiated trailing edge of said input pulse by said gating means thereby indicating whether the width of said input pulse is within the tolerance established by said first and second timing signals.

9. A pulse width evaluating system comprising: an input circuit for receiving an input pulse to be evaluated and including means for differentiating at least the trailing edge of said input pulse; gating means coupled to said input circuit, said gating means being normally closed and having means for opening the same responsive to a gating signal; and timing means having means for initiating a timing period coincident with the leading edge of said input pulse, said timing means having means for providing a gating signal having a predetermined duration after a predetermined time delay following initiation of said timing period, said timing means being coupled to said gating means for providing said gating signal thereto whereby said differentiated trailing edge of said input pulse is passed by said gating means only when the same occurs during said gating signal.

10. A pulse width evaluating system comprising: an input circuit for receiving an input pulse to be evaluated and including means for differentiating at least the trailing edge of said input pulse; gating means coupled to said input circuit, said gating means being normally closed and having means for opening the same thereby to pass said differentiated trailing edge responsive to a first gating signal and for reclosing the same responsive to a second gating signal; timing means having means for initiating a timing period coincident with the leading edge of said input pulse, said timing means having means provding first and second timing signals respectively after first and second predetermined time delays following initiation of said timing period; and means coupling said timing means to said gating means for respectively providing said first and second gating signals responsive to said timing signals whereby said differentiated trailing edge of said input pulse is passed by said gating means only when the same occurs between said timing signals.

11. A pulse width evaluating system comprising: an input circuit for receiving an input pulse to be evaluated and including means for differentiating at least the trailing edge of said input pulse; gating means coupled to said input circuit; and timing means having means for initiating a timing period coincident with the leading edge of said input pulse; said timing means being coupled to said gating means for opening the same after a first predetermined time delay and for closing the same after a second predetermined time delay following initiation of said timing period whereby said differentiated trailing edge of said input pulse is passed by said gating means only when the same occurs between said time delays.

References Cited in the file of this patent
UNITED STATES PATENTS

| | | |
|---|---|---|
| 2,784,310 | Cowan | Mar. 5, 1957 |
| 2,874,217 | Diehl | Feb. 17, 1959 |

OTHER REFERENCES

"The Interval Selector: A Device for Measuring Time Distribution of Pulses," Arthur Roberts Review of Scientific Instruments, February 1941; vol. 12, pages 71–76.

UNITED STATES PATENT OFFICE
CERTIFICATE OF CORRECTION

Patent No. 2,985,828                                      May 23, 1961

Charles F. Mason

It is hereby certified that error appears in the above numbered patent requiring correction and that the said Letters Patent should read as corrected below.

Column 10, line 74, after "bistable" insert -- means coupled to said gating means and having an output circuit, said bistable --.

Signed and sealed this 31st day of October 1961.

(SEAL)
Attest:

ERNEST W. SWIDER
Attesting Officer

DAVID L. LADD
Commissioner of Patents